United States Patent
Pavageau et al.

(10) Patent No.: US 11,074,574 B2
(45) Date of Patent: Jul. 27, 2021

(54) METHOD FOR PROCESSING DATA BY A PAYMENT TERMINAL, CORRESPONDING PAYMENT TERMINAL AND PROGRAM

(71) Applicant: INGENICO GROUP, Paris (FR)

(72) Inventors: Stephane Pavageau, La Roche de Glun (FR); Roger Devornique, Valence (FR)

(73) Assignee: INGENICO GROUP, Paris (FR)

( * ) Notice: Subject to any disclaimer, the term of this patent is extended or adjusted under 35 U.S.C. 154(b) by 89 days.

(21) Appl. No.: 15/941,758

(22) Filed: Mar. 30, 2018

(65) Prior Publication Data

US 2018/0285858 A1 Oct. 4, 2018

(30) Foreign Application Priority Data

Mar. 31, 2017 (FR) ...................................... 1752779

(51) Int. Cl.
*G06Q 20/32* (2012.01)
*H04L 9/30* (2006.01)
*G06Q 20/04* (2012.01)

(52) U.S. Cl.
CPC ....... *G06Q 20/3278* (2013.01); *G06Q 20/047* (2020.05); *G06Q 20/32* (2013.01); *H04L 9/30* (2013.01)

(58) Field of Classification Search
CPC .................................................. G06Q 20/3278
See application file for complete search history.

(56) References Cited

U.S. PATENT DOCUMENTS

| 2008/0041937 | A1 | 2/2008 | Vawter | |
| 2012/0204032 | A1* | 8/2012 | Wilkins | H04L 9/006 713/170 |
| 2013/0325679 | A1* | 12/2013 | Yeri | G06Q 40/02 705/35 |
| 2014/0074637 | A1* | 3/2014 | Hammad | G06Q 20/227 705/21 |
| 2014/0244495 | A1 | 8/2014 | Davis et al. | |

(Continued)

FOREIGN PATENT DOCUMENTS

FR 3041132 A1 3/2017
WO 2015100385 A1 7/2015

OTHER PUBLICATIONS

Ortiz-Yepes, D., (2016), "A Review of Technical Approaches to Realizing Near-Field Communications Mobile Payments," in IEEE.*

(Continued)

*Primary Examiner* — Olabode Akintola
*Assistant Examiner* — Brandon M Duck
(74) *Attorney, Agent, or Firm* — David D. Brush; Westman, Champlin & Koehler, P.A.

(57) ABSTRACT

A method for processing transactions of the type including transmission, to a communications terminal, of a receipt relating to a payment transaction during the implementation of this payment transaction by a payment terminal. The method includes, in the payment terminal: obtaining a piece of data representing an end of a transaction; building a data structure according a piece of data of the transaction, the data structure representing a receipt; transmitting a signal including at least the data structure; subsequently to the step of transmission, finalizing the transaction, including the transmission of a piece of finalizing data to be transmitted to a user.

11 Claims, 2 Drawing Sheets

(56) References Cited

U.S. PATENT DOCUMENTS

| | | | |
|---|---|---|---|
| 2015/0046304 A1* | 2/2015 | Bondesen | G06Q 40/10 |
| | | | 705/31 |
| 2017/0076261 A1 | 3/2017 | Ducrohet | |
| 2018/0047023 A1* | 2/2018 | Bouda | G06Q 20/20 |
| 2018/0083935 A1* | 3/2018 | Fang | H04L 51/38 |
| 2018/0349901 A1* | 12/2018 | Chen | G06Q 20/08 |

OTHER PUBLICATIONS

French Search Report dated Jul. 10, 2017 for corresponding French Application No. 1752779, filed Mar. 31, 2017.

English translation of the French Written Opinion dated Jul. 10, 2017 for corresponding French Application No. 1752779, filed Mar. 31, 2017.

Berners-Lee et al., "Uniform Resource Identifier (URI): Generic Syntax", Network Working Group, Request for Comments: 3986, Jan. 2005.

* cited by examiner

METHOD FOR PROCESSING DATA BY A PAYMENT TERMINAL, CORRESPONDING PAYMENT TERMINAL AND PROGRAM

1. FIELD OF THE INVENTION

The field of the invention is that of the communication of payment information. More particularly, the invention relates to a technique for communicating information on payment through the use of a radio-type link between a payment terminal and a communications terminal.

2. PRIOR ART

The possibility of making a payment through a smartphone-type communications terminal has been widely documented, especially since general consumer-oriented communications terminals have been integrating secured data-processing environments. These secured environments comprise a processor and/or secured memory and enable the processing and storage of information in secured form. This is advantageous for example in enabling the processing of credit-card, payment-card and biometric-data type confidential information.

A substantial portion of the many payment methods that have been disclosed use a specific application installed in the smartphone that enables the saving and use of a plurality of payment cards: the data of the payment card is entered, or photographed by means of the communications terminal and saved, at least partly, within the secured environment of the user's communications terminal.

When the user wishes to use his communications terminal to make a payment in proximity to a merchant, he opens the appropriate application on his payment terminal, selects the payment card that he wishes to use and validates payment. Such a payment method is described for example in the US patent application US20140244495. Most frequently, as in US20140244495, the payment information is transmitted to the payment terminal by the user's communications terminal. Several methods of transmission are possible, depending on the equipment available in the user's communications terminal. These are:

- for example the use of an NFC-type very-short-range radio transmission;
- or again the use of a specific device, that is an adjunct to the communications terminal, in order to mimic the presence of a magnetic stripe payment card.

The fact remains that the communications terminal transmits data to the payment terminal as if the user were using a classic payment card and not his communications terminal. The user is then requested, if necessary, to enter a personal identification code (of the PIN code type) on the merchant's payment terminal to validate the transaction. As a rule, the transaction is implemented conventionally, by the merchant's payment terminal: the transaction data passes through the merchant's bank, the network of the payment card issuing entity and then the user's bank so that these actors collectively validate the payment transaction.

When the payment transaction is validated, a payment receipt is printed out by the payment terminal or a cash register and is given by the merchant to the customer. In a certain number of situations, it is possible however that such a receipt cannot be printed. The user is then in an unpleasant situation because although he has made payment with a device (the smartphone) that he might trust, he cannot be sure that the total amount paid for his purchases with his smartphone is identical to the initially stipulated amount.

The US patent application US20140244495 seems to provide for the user to be capable of having a payment receipt at his disposal in his communications terminal. By contrast, no technique for transmitting this information to the communications terminal is disclosed, so that it is not possible to know how this information is transmitted to the communications terminal.

As a general rule, when the customer pays a physical merchant with a bank card or a communications terminal, two types of documents are printed out by the payment terminal (or the cash register): an invoice comprising a list of products purchased and also comprising an indication on possible guarantees related to the products on this list, and a bank card payment receipt, this payment receipt being used as proof of payment by bank card: this payment receipt has no value in terms of guarantee. The patent application US20140244495 does not distinguish the type of "document" presented to the user's smartphone. It is likely to be a list of products purchased as indicated several times, especially in the figures. Now, as indicated here above, these documents do not have the same legal value and do not pursue the same goals.

In general, it can be seen, from the different methods of payment through communications terminals, that the final payment process (i.e. the issuing of documents of proof to the customer) is not part a subject of interest to manufacturers.

There is therefore a need to provide a technique for transmitting a payment receipt to the communications terminal of the user who has made payment by using a communications terminal.

3. SUMMARY OF THE INVENTION

The proposed technique does not have these drawbacks of the prior art. More particularly, the proposed technique implements a principle of immediate transmission, at the time of the transaction, of a signal representing the end of a transaction, this signal being directly transmitted to the communications terminal.

A method of transaction processing is thus described. This method is of the type consisting of the transmission, to a communications terminal, of a receipt relating to the payment transaction during the implementation of this payment transaction by a payment terminal, the method being characterized in that it comprises, in the payment terminal:

- obtaining a piece of data representing an end of a transaction;
- building a data structure according a piece of data of said transaction and representing a receipt;
- transmitting a signal comprising at least said data structure;
- subsequently to the step of transmission, finalizing the transaction comprising the transmission of a piece of finalizing data to be transmitted to a user.

Thus, contrary to the prior-art techniques, it is made sure that, immediately at the end of the transaction, the communications terminal that transmits the payment data to the payment terminal has an indicator or pointer representing the transaction: the communications terminal is thus informed in real time or almost in real time of the finalizing of the transaction and the user is, so to speak, reassured that he has a piece of information about this transaction.

According to one particular embodiment, the act of building a data structure as a function of a piece of data about said transaction comprises:

determining a resource-locating address at which said receipt is available as a function of the piece of data representing an end of transaction;

insertion of said resource-locating address within a recording.

Thus, instead of building the receipt itself, the payment terminal limits itself to providing an address at which the receipt can be obtained. This is valuable for example when the payment terminal has few computation resources.

According to one particular embodiment, said recording is an NDEF recording.

Thus, the communications terminal is more capable of receiving data that it is able to process, since an NDEF recording comes under a known standard.

According to one particular embodiment, the act of determining a resource-locating address comprises:

obtaining a resource-locating address header;

obtaining a receipt identifier from the data of said transaction;

concatenating the header of the resource-locating address and the receipt identifier, delivering the resource-locating address.

Thus, dividing the building of the address into several steps enables the merchant to set the parameters of these different elements so that he can point towards a server that the he controls and with which he is capable of providing the client with a receipt-customizing service.

According to one particular embodiment, prior to inserting said resource-locating address within a recording, the method comprises encryption of at least one portion of the resource-locating address by means of a public key of the communications terminal.

Thus, only the communications terminal that has its private key is capable of accessing this receipt. The payment terminal thus ensures the confidentiality and integrity of the information transmitted to the communications terminal because only this communications terminal is capable of obtaining knowledge of it.

According to one particular embodiment, the method comprises the following steps prior to the act of obtaining the piece of data representing an end of a transaction:

sending a request to a user's communications terminal, for obtaining payment data;

receiving the payment data from the communications terminal;

creating a payment transaction by means of said payment data and at least one piece of data of said payment terminal;

validating the payment transaction delivering the piece of data representing an end of transaction.

Thus, the transmission of the data representing the receipt to the communications terminal is implemented at the same time as the payment transaction itself.

According to one particular embodiment, the method further comprises:

transmission, to a merchant server, of a receipt identifier;

transmission, to the merchant server, of pieces of data of the transaction belonging to the group comprising:

the amount of the transaction;

the object of the transaction;

the beneficiary of the transaction;

the date and time of the transaction;

the place of the transaction;

at least one piece of payment data.

Thus, the merchant server is capable of building a customized receipt, i.e. a receipt adapted to the merchant's wishes to efficiently communicate with his customers, especially through the use of a receipt that is adapted to the situation and can be built by using processing resources far greater than those of a payment terminal, with a result that is less disappointing for the customer.

According to one particular embodiment, said receipt is tax-exemption receipt transmitted following a payment representing a donation made on the payment terminal, said payment terminal being an independent unsupervised terminal.

Thus, the user who wishes to make a payment through a terminal or an independent station is immediately informed about the amount of the transaction and/or its tax exemption characteristics without requiring the entry of complementary data, such as his personal details.

According to another aspect, the invention also describes a payment terminal comprising means for implementing a method of transaction processing and especially means of transmission, to a communication terminal, of a receipt relating to a payment transaction. Such a payment terminal comprises:

means for obtaining a piece of data representing an end of a transaction;

means for building a data structure as a function of a piece of data of said transaction;

means for transmitting a signal comprising at least said data structure;

means for finalizing the transaction, comprising means for transmitting a piece of finalizing data to a user.

According to a preferred implementation, the different steps of the method according to the proposed technique are implemented by one or more software programs or computer program comprising software instructions to be executed by a data processor of a relay module according to the proposed technique, designed to command the execution of different steps of the methods.

The invention is therefore also aimed at providing a program capable of being executed by a computer or by a data processor, this program comprising instructions to command the execution of the steps of a method as mentioned here above.

This program can use any programming language whatsoever and be in the form of source code, object code or intermediate code between source code and object code such as in a partially compiled form or in any other desirable form whatsoever.

The proposed technique is also aimed at providing an information carrier readable by a data processor and comprising instructions of a program as mentioned here above.

The information carrier can be any entity or device whatsoever capable of storing the program. For example, the carrier can comprise a storage means such as a ROM, for example, a CD ROM or a microelectronic circuit ROM or again a magnetic recording means, for example a floppy disk or a hard disk drive.

Furthermore, the information carrier can be a transmissible carrier such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond, in this document, equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the module concerned. It can be a programmable hardware component or a component with an integrated processor for the execution of software, for example, an integrated circuit, a smart card, a memory card, an electronic board for the execution of a piece of firmware etc.

Each component of the system described here above implements of course its own software modules.

The different embodiments mentioned here above can be combined with one another to implement the invention.

4. FIGURES

Other features and advantages of the invention shall appear more clearly from the following description of a preferred embodiment, given by way of a simple illustrative and non-exhaustive example and from the appended drawings, of which.

5. DESCRIPTION

5.1. General Principle

The general principle of the present technique consists of the transmission of payment information by means of an NFC-type signal to the user's communications terminal. This transmission of an NFC signal can be carried out in addition to or instead of the printing out of the payment receipt by the payment terminal. This NFC-type signal is transmitted to the communications terminal by using the same equipment as that used by the communications terminal to transmit payment data (for example bank card data) to the payment terminal. As an alternative (or additionally) a BlueTooth Low Energy (BLE) type signal can also be transmitted by the payment terminal to the communications terminal.

Whatever the type of signal employed, the goal is to achieve almost immediate transmission to the communications terminal of data representing a payment receipt and/or an invoice and/or a tax-exemption receipt. The immediate transmission is important. There is no question in the present invention of requesting additional action on the part of the user in order to carry out this transmission. Indeed, in the prior art, a "simple" way of carrying out a transmission of an invoice is to ask the user to enter an email address to which the merchant can send this invoice. However, the additional entry and the transmission, by the user (or by the merchant), of such a piece of data can raise problems and/or be not possible. It can raise problems because, as a rule, the time taken to transmit the email to which the invoice is attached is more or less lengthy. As a result, the user is not immediately informed of the amount paid for the purchase. Besides, this transmission by email concerns only the invoice for the purchase. The receipt of payment by bank card is not transmitted by electronic mail and generally continues to be printed by the payment terminal. Besides, the solutions that have just been described apply when the payment terminal is managed by a merchant who is physically present in the shop: these solutions cannot be applied for example when the payment terminal is independent (for example a payment terminal for an "automatic" petrol station): in this type of situation, when the payment terminal has no paper left to print out the payment receipt, no receipt is printed and the user is faced with an unpleasant situation in which he cannot be certain that the amount to be debited will correspond to the amount displayed on the terminal. Indeed, any entry, by the user, of an email address requires that the independent payment terminal should be provided with means for entering such information, which is not always the case.

On the contrary, according to the invention, the data needed are transmitted almost immediately to the user's communications terminal: these are pieces of data about the payment receipt (or the invoice or the tax-exemption receipt), or information enabling access to this payment receipt. To this end, according to the invention, the payment terminal, upon reception of information relating to a finalizing of a transaction (coming from a transaction server), creates a particular data structure: this particular data structure comprises at least one identifier, possibly derived from the transaction. This data structure, depending on the embodiment, is inserted into a particular recording of data which is itself transmitted, by means of an appropriate signal, to the communications terminal.

Upon reception of this signal, the communications terminal triggers the implementing of a particular reception process that depends essentially on the technology used to transmit the signal to the communications terminal. As described here below in the context of one particular embodiment, an NFC-type signal is immediately transmitted to the communications terminal as soon as the transaction has ended.

However, the inventors have observed that, in an operational environment, the immediate transmission of this signal to the communication terminal has to be carried out according to a particular procedure. The explanation is follows: when a user makes payment by means of a communications terminal (or a contactless payment card) he is asked to place his payment means on the payment terminal. The fact is that, contrary to what is usually claimed by the manufacturers, the NFC interface of the payment terminals can be used, in operational conditions, only at very short distances. This generally means that the payment means are put into contact with the payment terminal. When the transaction is completed (either by payment or by a rejection of a transaction), the screen of the payment terminal displays an end-of-transaction indication (for example a validation logo). When the user sees this piece of information displayed on the screen, he removes his payment means. From this removal onwards, it is generally no longer possible to transmit any information whatsoever to the communications terminal which is far too distant from the payment terminal. The situation that has just been described is also true when printing out a payment receipt: as soon as the printing starts, the user, by a reflex action, removes his payment means from the payment terminal which can then no longer be accessed.

Thus, to successfully transmit information to the user's communications terminal, this problem needs to be resolved. According to the invention, the solution consists in using a command for creating a payment receipt and a command for transmitting the payment receipt, these commands being implemented in succession as soon as the transaction has been accepted or rejected. These two commands are interposed, before the display or printing of any information whatsoever by the payment terminal.

More particularly, these two commands (or sub-commands) are implemented upon reception, from the transaction server (or from the payment terminal itself when the transaction is done locally, i.e. without confirmation from a transaction server), of acceptance or rejection of the transaction.

Thus, the probability of the presence of the user's communications terminal is maximized: indeed, so long as the user receives does not receive confirmation of payment by the payment terminal, he is not asked to remove the payment means (the communications terminal) used and thus it is possible to transmit a signal to this payment means.

Figure 1:
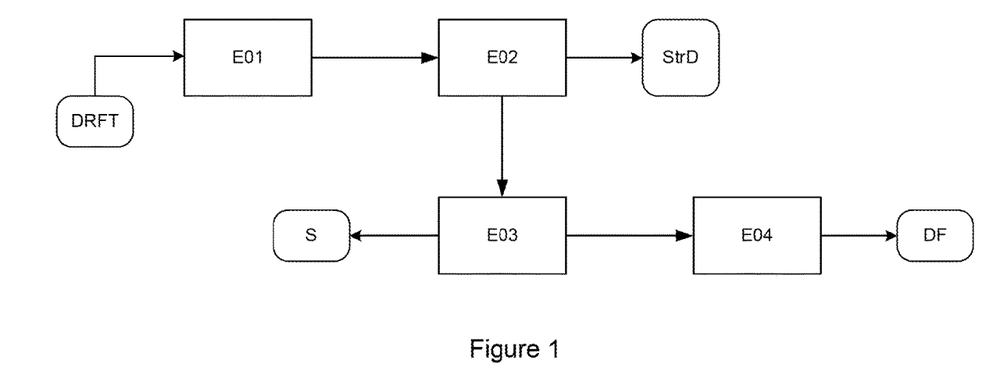
FIG. 1 presents the different steps of processing according to the invention.

In general, referring to FIG. 1, the method for transmitting data according to the invention therefore comprises:
 receiving (E01) a piece of data representing an end of transaction (DRFT);
 building (E02) a data structure (StrD) according to a piece of data of said transaction (DRFT);
 transmitting (E03) a signal (S) comprising at least said data structure (StrD);
 finalizing (E04) the transaction comprising the transmission of a piece of finalizing data (DF) to be transmitted to the user.

The reception of the piece of data representing an end of transaction is the element that triggers the implementing of the proposed technique. However, in order to accelerate the process, some of the data inserted into the data structure can be created in advance, depending on the embodiments, as shall be explained here below.

The building of the data structure (representing a payment receipt or a tax-exemption receipt or an invoice) is done chiefly according to the transaction number. In one particular embodiment, the data structure comprises only one piece of data representing or depending on the transaction number itself. More particularly, in one specific embodiment, an encryption of the transaction number is carried out by using a public key provided by the communications terminal during the transaction. This encrypted data is inserted into the data structure and then transmitted to the communications terminal (a signal is formed, especially by means of the data structure).

The piece of finalizing data can be a piece of data to be displayed on the screen of the payment terminal (or another screen connected directly or indirectly to the payment terminal). It can for example be a piece of data triggering the display of a logo on the screen or again a piece of data triggering the print-out (physical print-out) of an invoice or again a piece of data triggering the sending of a sound representing an end of transaction.

5.2. Description of One Embodiment

Figure 2:
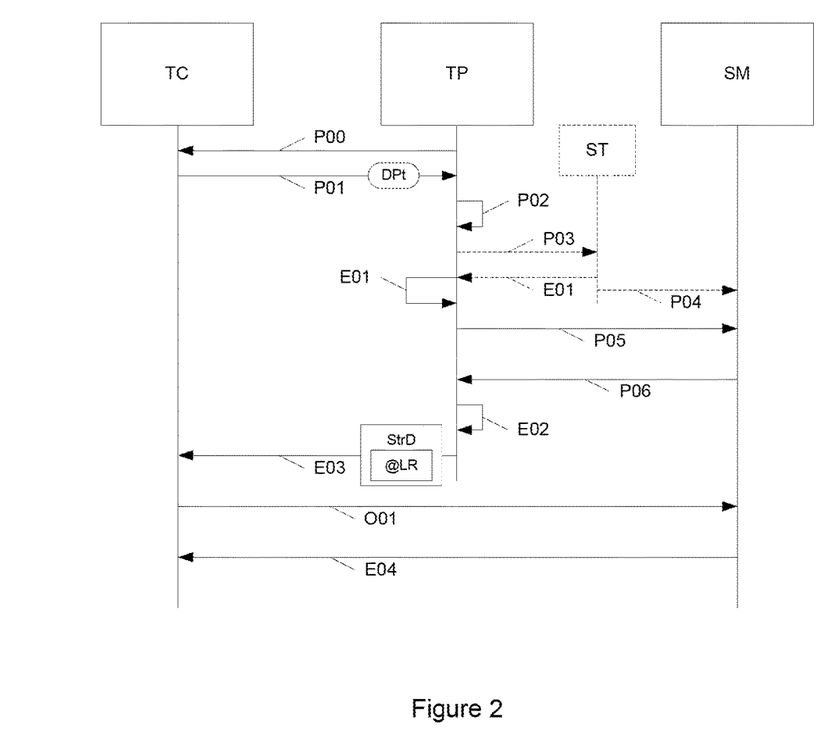
FIG. 2 presents possible steps prior to the processing according to one embodiment.
Figure 3:
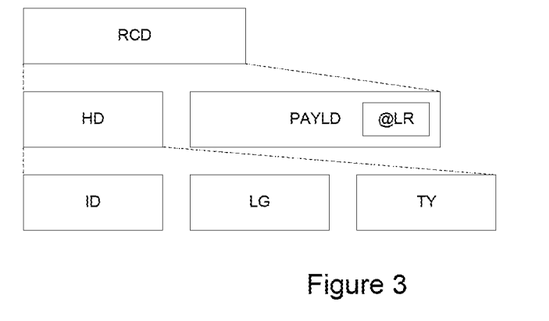
FIG. 3 describes the obtaining of a tax-reduction receipt according to one embodiment.

In this embodiment, a description is made, with reference to FIGS. 2 and 3, of an implementing of the technique described here above in the context of the transfer of a tax-exemption receipt attesting to a donation made to an association or a cause and giving rise to an entitlement to tax exemption. Indeed, when a payment is made by a communications terminal (NFC or BLE) on an independent interactive kiosk or station or an independent collection device without printing means, it is not possible to receive any payment receipt or tax-exemption receipt whatsoever (in the case of donations to charities). To receive such a receipt (payment or tax-exemption), the user must link up to the merchant's site and/or to the site of the organization carrying out the campaign and must make a request for reception.

The technique described here above is used for the almost immediate transmission of this payment receipt and/or tax-exemption receipt to the holder of the communications terminal who has made this payment. This embodiment focuses on the use of NFC technology comprising especially the use of NDEF-type recordings. The method comprises the following steps, as described with reference to FIG. 2:
 sending (P00) a request for obtaining payment data (DPt) to a user's communications terminal (TC);
 receiving a payment data (DPt) from the communications terminal (TC);
 the creation (P02), by the payment terminal (TP), of a payment transaction by means of said payment data (DPt) and at least one piece of data of said payment terminal;
 a step, if necessary, for communicating (P03) with a transaction server (ST) comprising the transmission of a piece of information on transaction and possibly the reception (E01) of a piece of information on the end of the transaction; when no communication with a server is requested (offline transaction), the payment terminal (TP) alone determines the end of the transaction;
 validating (P05) the payment transaction with a server (SM): this validation can lead to the issuing (P06) of the piece of data representing an end of a transaction (DRFT), although this piece of data representing an end of transaction (DRFT) can be determined by the payment terminal (TP) itself;
 building (E02) a data structure (StrD) as a function of a piece of data of said transaction (DRFT);
 transmitting (E03) a signal (S) comprising at least said data structure (StrD) to the communications terminal (TC);
 the obtaining (O1), by the communications terminal, of the receipt from the merchant server (SM), of the receipt using the data of the data structure;
 subsequently to the act of transmitting (E03), finalizing (E04) the transaction comprising the transmission of a piece of finalizing data to be transmitted to a user.
 The steps for validating a transaction and issuing the end-of-transaction data can be used by the payment terminal to transmit data needed for the preparation of the receipt by the merchant server.
 the transmitting of the receipt identifier (IdRcpt), by the merchant server (SM);

transmitting data on the transaction to the merchant server (SM), this data belonging to the group comprising:
  the amount of the transaction;
  the purpose of the transaction;
  the beneficiary of the transaction;
  the date and time of the transaction;
  the place of the transaction;
  at least one piece of data on payment (DPt).

These pieces of data enable the merchant server to generate the requested receipt in advance or upon request (i.e. upon a request received from the communications terminal), in attaching thereto its own data (data on identity of the merchant or of the donation organization for example).

In this embodiment, the payment terminal receives (determines) a piece of data representing the end of the payment transaction made by the user through his communications terminal. To make such payment, the user has for example used an electronic wallet (Wallet) type application, launched on his communications terminal. This application has enabled him to select a payment card to be used to make the payment (if he possesses several payment cards) and possibly confirm the payment by entering a personal identification code (of the PIN code type) within the wallet application.

The bank card data has been at least partially transferred to the payment terminal when the user places his communications terminal on the payment terminal. The payment terminal processes the payment transaction according to the data received by the communications terminal and the goods or services purchased and/or the donations made by the user. This processing comprises the generating of a payment transaction identifier that enables this transaction to be distinguished uniquely among all the transactions made.

On the basis of this transaction identifier, the payment terminal builds a data structure comprising at least one piece of data that is extracted and/or that is linked to this transaction identifier.

In a first case, a piece of data derived from the transaction identifier is computed and then encrypted. This piece of derived data is for example the result of a hash function performed on the basis of the transaction number. This piece of derived data is then encrypted, for example by using a public key (received from the communications terminal for example). The piece of encrypted, derived data is then inserted into a data structure representing a data transmission recording. The data transmission recording is for example an NDEF (NFC Data Exchange Format) recording. This recording as described here below is itself part of an NDEF message potentially comprising a plurality of recordings.

In a second case, a piece of external data is obtained on the basis of the transaction identifier. This piece of external data is delivered by the merchant: the merchant uses the transaction number to generate a unique identifier that is proper to him and transmits this unique identifier to the payment terminal, possibly accompanied by complementary data. As in the previous case, the unique identifier is encrypted and inserted into a data structure representing a data transmission recording. The data transmission recording is for example an NDEF recording.

According to one specific embodiment, this unique identifier is attached to a header of a resource-locating address (of the URL type) and thus constitutes a link enabling access to a resource identifier identified by the unique identifier (in this case the unique identifier is not necessarily encrypted). A resource-locating address header takes for example the following form: https://receipts.foundation.com/id=. To reduce the size of the header, a "tiny URL" type of reduced header is used, advantageously enabling the use of a limited number of NDEF recording on the one hand and therefore accelerating the transmission of the information by NFC on the other hand. FIG. 3 presents an example of NDEF recording:

Such a recording (RCD) comprises a header (HD) comprising an identifier (ID) a length (LG) and a type (TY): in this implementation the type is the "URL type" defined by the RFC 3986 standard. The identifier (ID) is equal to 0x 04. The length depends on the length of the URL (PAYLD). As for the URL, it is a rather reduced "tiny" type URL enabling the attachment thereto of the unique identifier while remaining within a total recording length close to 48 bytes. The NDEF recording is inserted into an NDEF message. The goal here is to minimize the NDEF message in order to accelerate its transmission at the end of the transaction.

In a second embodiment, the header of a resource-locating address is inserted into a second NDEF recording and the (encrypted) identifier is inserted into the first NDEF recording: the second embodiment is more secured since the identifier can be encrypted in the first NDEF recording and then decrypted by the communications terminal which alone is capable of going to the locating address to obtain the receipt.

In a third embodiment, the unique identifier is attached to a header of a resource-locating address (of the URL type) and thus constitutes the link, encrypted with a public key of the communications terminal and transmitted, in the NDEF recording. The communications terminal decrypts the NDEF recording data and obtains (downloads) the resource available at the resource-locating address.

The resource-locating address header is given by the payment terminal. The way in which the payment terminal obtains this header varies according to the embodiments. However, as described here below, a payment terminal according to the invention comprises at least one secured processor and one general processor. These two processors are the subject of a configuration, at the time of the installation of the payment terminal (for example for an independent payment station). During this configuration, advantageously, a processing application is configured to provide or obtain the resource-locating address header (through a request made to a server). This resource-locating address header is used to form the complete resource-locating address.

When all the data is obtained and processed, an NDEF message is inserted into the NFC signal transmitted to the communications terminal. The communications terminal, upon reception of this signal (and of the NDEF message that it contains):
  extracts the identifier (encrypted or not) coming from an NDEF recording; and/or
  extracts the resource-locating address (encrypted or not) coming from an NDEF recording;
  optionally, if the identifier or the address is encrypted with a public key of the communications terminal, it decrypts this identifier or this address;
  optionally, if a resource-locating address header is present independently, it extracts this header.

Depending on the embodiments described:
  when a complete resource-locating address is formed by means of the data received from the NDEF message, the communications terminal obtains the resource indicated at this address: this is a complete payment receipt and/or tax-exemption receipt comprising all the data needed for this type of document;

when only one identifier is present, the terminal, through other channels, obtains a resource-locating address, possibly depending on the (decrypted) identifier, and obtains the resource indicated at this address, which as above is a complete payment receipt and/or tax-exemption receipt comprising the set of data needed for this type of document.

Thus, the payment terminal has a payment receipt (or tax-exemption receipt) almost immediately after the transaction. The user is therefore able to obtain proof of payment (and/or tax exemption) very speedily without any particular action on his part.

In another embodiment, oriented more towards obtaining a payment receipt, the payment terminal directly forms an NDEF message comprising a plurality of NDEF recordings: these recordings comprise the totality of the data of the payment receipt. The NDEF message is transmitted, through the NFC signal, to the communications terminal which decodes this signal, extracts the data from the NDEF message and builds, for example in the form of a PDF-type file, a payment receipt capable of being recorded within the communications terminal.

For its part, the payment application (the wallet) installed in the communications terminal comprises functions enabling it to obtain and process the data obtained. The application comprises a module for receiving NFC signals concomitantly with the implementing of a payment transaction. The application also comprises a component for processing NDEF messages coming from the payment terminal and components for managing this NDEF data, i.e. by building a receipt and/or downloading resources coming from a third-party server (accessible through the resource-locating address).

5.3. Other Features and Advantages

Figure 4:
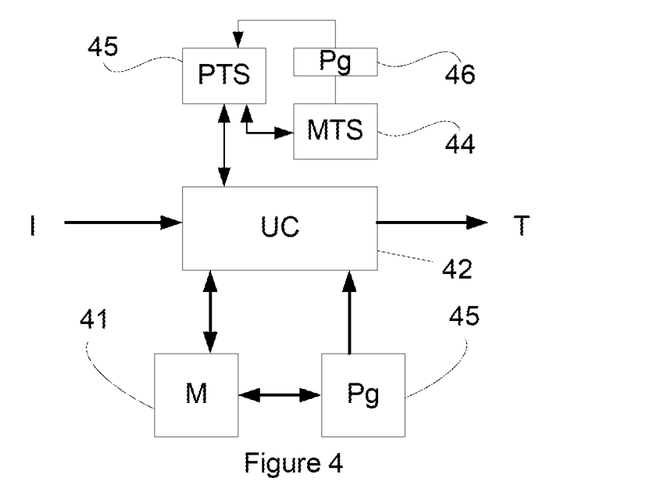
FIG. 4 discloses a communications terminal in an overall view.

Referring to FIG. 4, we describe a payment terminal (TP) implemented to manage the transmission, at the time of the transaction, of payment data to a communications terminal (TC) according to the method described here above.

For example, the payment terminal (TP) comprises a memory 41 comprising for example a buffer memory, a general processor 42, equipped for example with a microprocessor and driven by a computer program 43 and/or a secured memory 44, a secured processor 45 driven by a computer program 46, these processing units implementing data-processing methods as described here above to carry out the processing operations for preparing and transmitting data to a communications terminal (TC) used to make payment to a payment terminal (TP).

At initialization, the code instructions of the computer program 46 are for example loaded into a memory and then executed by the secured processor 45. The processor 45 inputs at least one piece of data representing a payment to be made. The secured processor 45 implements the steps of the method of transmission according to the instructions of the computer program 46 to obtain a piece of identification data derived, directly or not directly, from the payment transaction and carries out the preparation and transmission of a data structure to the communications terminal (TC) before the finalizing the payment transaction.

To this end, the payment terminal (TP) comprises, in addition to the memory 44 and the processor 45, communications means such as network communications modules, data transmission means and data transmission circuits for transmitting data between the different components of the terminal.

The means described here above can take the form of a particular processor and/or circuitry implemented within a specific device implanted within the payment terminal (TP). According to one particular embodiment, the payment terminal (TP) implements a particular application that is responsible for carrying out previously described operations, this application being for example provided by the manufacturer of the processor in question in order to enable the use of said processor. To this end, the method comprises unique identification means. These unique identification means ensure the authenticity of the processor. The functioning of the payment terminal is improved by allowing reducing the amount of physical components of such a terminal, because it does not need any printing means anymore, nor any data entering means (i.e. it does not need any keyboard for the user to enter its personal data). Additionally, the transaction is processed in a smoother way than previous transaction, which allows reducing the electric consumption of the payment terminal. Globally, the means used by the payment terminal can be specifically built for improving the functioning of the terminal. The secured processor and memory and communication interfaces may be arranged for achieving the transaction and the issuing of the receipt in a secured way for avoiding hacking.

Figure 5:
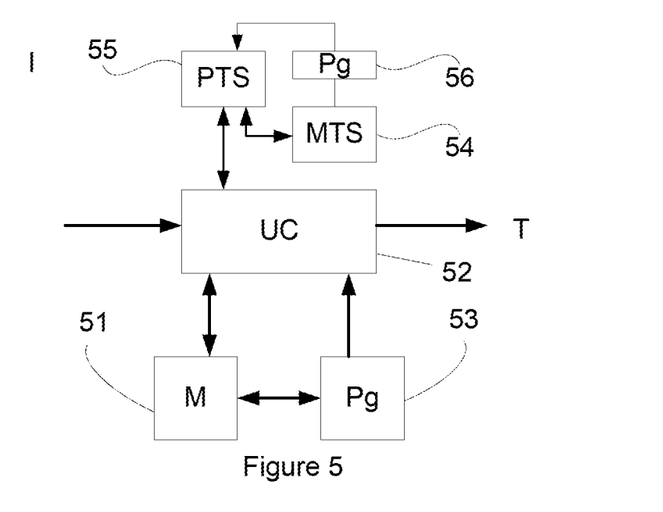
FIG. 5 discloses a payment terminal in an overall view.

Referring to FIG. 5, we describe a communications terminal (TC) implemented to obtain data pertaining to a transaction from a payment terminal (TP) according to the method described here above.

For example, the communications terminal (TC) comprises a memory 51 comprising for example a buffer memory, a general processor 52 equipped for example with a microprocessor and driven by a computer program 53 and/or a secured memory 54, a secured processor 55 driven by a computer program 56, these processing units implementing data-processing methods as described here above for a receipt representing the transaction prior to the finalization of the transaction by the payment terminal (TP).

At initialization, the code instructions of the computer program 56 are for example loaded into a memory and then executed by the secured processor 55. The processor 55 inputs at least one piece of data representing an identifier, possibly coming from the transaction identifier. The secured processor 55 implements the steps of the processing method according to the instructions of the computer program 56 in order to obtain, from this identifier, data representing the transaction (payment receipt, tax-exemption receipt). To this end, the communications terminal (TC) comprises, in addition to the memory 55, communications means such as network communications modules, data transmission means and data transmission circuits for transmitting data between the various components of the communications terminals.

The means described here above can take the form of particular processor and/or circuitry implemented within a specific device implanted within the communications terminal. According to one particular embodiment, the communications terminal (TC) implements a particular application that is responsible for carrying out the operations described here above, this application being for example provided by the manufacturer of the processor in question in order to enable the use of said processor. To this end, the processor comprises unique identification means. These unique identification means ensure the authenticity of the processor.

The functioning of the communications terminal is improved by allowing reducing the amount of time spent by the user for inputting data for retrieving the receipt from the payment terminal. Additionally, the transaction is processed in a smoother way than previous transaction, which allows reducing the electric consumption of the communications terminal.

The invention claimed is:

1. A method for processing a payment transaction between a payment terminal and a communications terminal of a user, wherein the method is performed by the payment terminal and comprises:
   the payment terminal conducting the payment transaction with the communications terminal of the user over a Near-Field Communication (NFC) or Bluetooth Low Energy (BLE) interface while the communications terminal of the user is in sufficient proximity to the payment terminal to receive transmissions over the interface;
   the payment terminal obtaining an identifier of the payment transaction representing an end of the payment transaction implemented by the payment terminal; and
   the payment terminal being triggered, by the obtaining of the identifier of the payment transaction, to:
      hash and encrypt the identifier of the transaction, providing a hashed and encrypted identifier;
      build a NFC Data Exchange Format (NDEF) record according the hashed and encrypted identifier, comprising:
         determining a tiny resource-locating address at which a receipt for the transaction is available according to the hashed and encrypted identifier, without the payment terminal building the receipt, itself;
         inserting said tiny resource-locating address within a payload field of said NDEF record on a memory of said payment terminal; and
      while the communications terminal of the user remains in sufficient proximity to the payment terminal to receive transmissions over the interface and before the payment terminal displays, prints or emits a sound indicating the end of the payment transaction:
         transmit a signal comprising at least said NDEF record to the communications terminal of the user, said signal being transmitted over the NFC or BLE interface.

2. The method according to claim 1, wherein the act of determining a resource-locating address comprises:
   obtaining a tiny resource-locating address header;
   obtaining a receipt identifier from data of said transaction;
   concatenating the header of the tiny resource-locating address and the receipt identifier, delivering the resource-locating address.

3. The method according to claim 1, wherein, prior to inserting said resource-locating address within payload field, the method comprises encryption of at least one portion of the resource-locating address by using a public key of the communications terminal.

4. The method according to claim 1, comprising the following acts performed by the payment terminal prior to the act of obtaining the identifier of the payment transaction representing an end of a transaction:
   sending a request to the user's communications terminal for obtaining payment data;
   receiving the payment data from the communications terminal;
   creating the payment transaction by using said payment data and at least one piece of data of said payment terminal;
   validating the payment transaction delivering the identifier of the payment transaction representing an end of transaction.

5. The method according to claim 1, comprising the following acts performed by the payment terminal:
   transmission, to a merchant server, of a receipt identifier;
   transmission, to the merchant server, of pieces of data of the transaction belonging to the group comprising:
      an amount of the transaction;
      an object of the transaction;
      a beneficiary of the transaction;
      a date and time of the transaction;
      a place of the transaction;
      at least one piece of the payment data.

6. The method according to claim 1, wherein said receipt is a tax-exemption receipt transmitted following a payment representing a donation made on the payment terminal, said payment terminal being an independent unsupervised terminal.

7. The payment terminal according to claim 6, wherein subsequently to the act of transmitting, the transaction is finalized by a server transmitting a piece of finalizing data to the communication terminal of the user, the piece of finalizing data triggering an event on the payment terminal.

8. The method according to claim 1, wherein subsequently to the act of transmitting, the transaction is finalized by a server transmitting a piece of finalizing data to the communication terminal of the user, the piece of finalizing data triggering an event on the payment terminal.

9. A payment terminal comprising:
   a Near-Field Communication (NFC) or Bluetooth Low Energy (BLE) interface;
   at least one processor; and
   at least one non-transitory computer-readable medium comprising instructions stored thereon, which when executed by the at least one processor configure the payment terminal to implement a method of processing a payment transaction between a payment terminal and a communication terminal of a user, wherein the method comprises:
   the payment terminal conducting the payment transaction with the communications terminal of the user over the NFC or BLE interface while the communications terminal of the user is in sufficient proximity to the payment terminal to receive transmissions over the interface;
   the payment terminal obtaining an identifier of the payment transaction representing an end of the payment transaction;
   in response to obtaining the identifier of the payment transaction, triggering the payment terminal to:
      hash and encrypt the identifier of the transaction, providing a hashed and encrypted identifier;
      build a NFC Data Exchange Format (NDEF) record according to the hashed and encrypted identifier, comprising:
         determining a tiny resource-locating address at which a receipt for the transaction is available according to the hashed and encrypted identifier, without the payment terminal building the receipt, itself;
         inserting said tiny resource-locating address within a payload filed of said NDEF record stored on a memory of said payment terminal;
      while the communications terminal of the user remains in sufficient proximity to the payment terminal to receive transmissions over the interface and before the payment terminal displays, prints or emits a sound indicating the end of the payment transaction:
  transmit a signal comprising at least said NDEF record to the communication terminal of the user, said signal being transmitted over the NFC or BLE interface.

10. A non-transitory computer-readable medium comprising a computer program product stored thereon and comprising program code instructions for executing a method of processing a payment transaction a payment transaction between a payment terminal and a communications terminal of a user, when the instructions are executed on at least one processor of the payment terminal, the method comprising:
  the payment terminal conducting the payment transaction with the communications terminal of the user over a Near-Field Communication (NFC) or Bluetooth Low Energy (BLE) interface while the communications terminal of the user is in sufficient proximity to the payment terminal to receive transmissions over the interface;
  the payment terminal obtaining an identifier of the payment transaction implemented by the payment terminal;
  in response to obtaining the identifier of the payment transaction, triggering the payment terminal to:
    hash and encrypt the identifier of the transaction, providing a hashed and encrypted identifier;
    build a NFC Data Exchange Format (NDEF) record according the hashed and encrypted identifier of the payment transaction, comprising:
      determining a tiny resource-locating address at which a receipt for the transaction is available according to the hashed and encrypted identifier of the payment transaction, without the payment terminal building the receipt, itself;
      inserting said tiny resource-locating address within a payload field of said NDEF record on a memory of said payment terminal; and
    while the communications terminal of the user remains in sufficient proximity to the payment terminal to receive transmissions over the interface and before the payment terminal displays, prints or emits a sound indicating the end of the payment transaction:
      transmit a signal comprising at least said NDEF record to the communications terminal of the user, said signal being transmitted over the NFC or BLE interface.

11. The non-transitory computer-readable medium according to claim 10, wherein subsequently to the act of transmitting, the transaction is finalized by a server transmitting a piece of finalizing data to the communication terminal of the user, the piece of finalizing data triggering an event on the payment terminal.

* * * * *